April 2, 1946.  A. TOWNHILL  2,397,576
QUICK DISCONNECT COUPLING
Filed Sept. 20, 1943
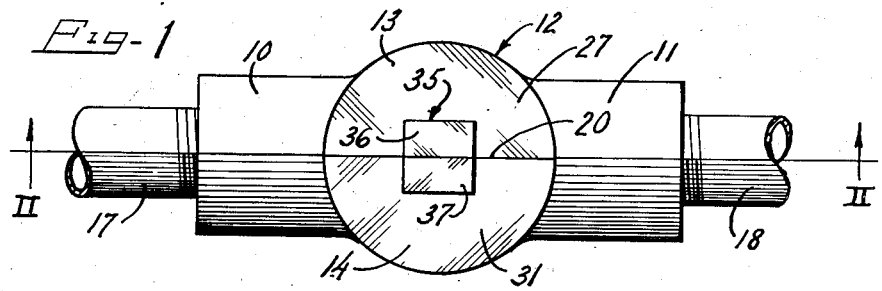
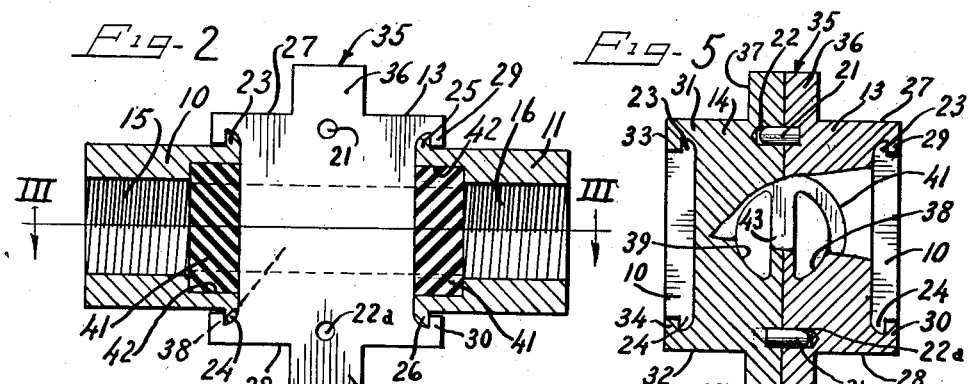
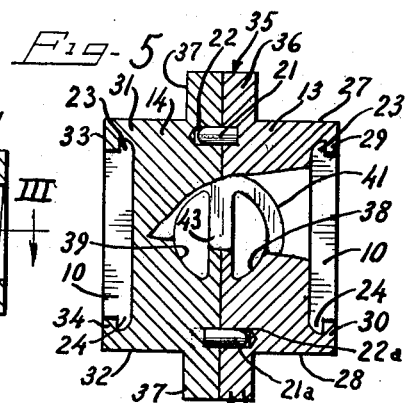
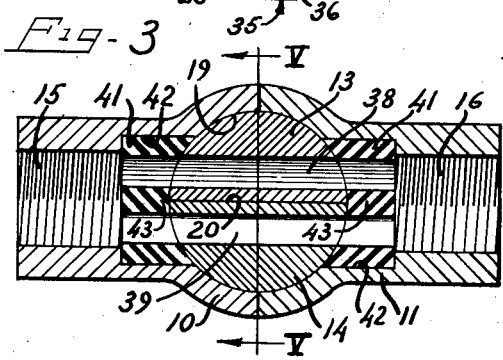
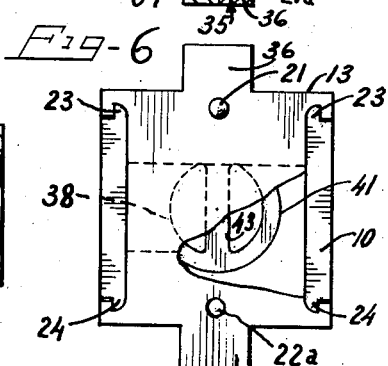
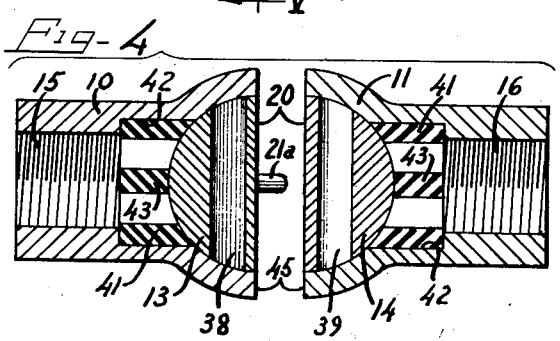
Inventor
ARTHUR TOWNHILL
by
Attys.

Patented Apr. 2, 1946

2,397,576

UNITED STATES PATENT OFFICE 2,397,576

QUICK DISCONNECT COUPLING

Arthur Townhill, Cleveland, Ohio, assignor to Thompson Products, Inc., Cleveland, Ohio, a corporation of Ohio Application September 20, 1943, Serial No. 503,013

10 Claims. (Cl. 284—4)

The present invention relates to self-sealing couplings adapted for quick and easy operation while automatically sealing the coupling parts when the same are detached from each other. More particularly, the invention pertains to a device for coupling together the ends of tubes, pipes and the like to place the same in unrestricted communication when coupled together and to seal the ends thereof when they are uncoupled.

According to the present invention, complementary coupling parts are arranged to receive the ends of tubes or the like which are to be placed in unrestricted fluid flow communication. The invention contemplates the provision of a split, rotatable, generally cylindrical valve to detachably connect the coupling parts and to control the fluid flow between said parts. By virtue of its being split, a portion of the valve is adapted to be retained in each coupling part for sealing the respective parts when they are uncoupled to prevent drainage or leakage of the fluid from the ends of the tubes.

The valve may be rotatably mounted in a cylindrical chamber formed by a semi-cylindrical recess in each coupling part or box. The recess of each box is provided with a port communicating with one of the tubes, pipes or other forms of conduit which the coupling unit is intended to connect. The valve, or plug, as it may be called, rotates about an axis normal to the axes of the ports in the coupling boxes and provides means for joining the ports when the plug is so positioned that it locks the boxes together in fluid flow communication. Means are also provided for retaining a portion of the split valve or plug in each coupling box for effectively sealing the ports when said coupling boxes are detached or uncoupled.

It is, therefore, an object of the present invention to provide a coupling unit having a valve or plug for placing the coupling parts in fluid flow communication and for sealing each coupling part when the coupling is disconnected.

Another object of the invention is to provide a coupling unit employing a split plug or valve to act as a locking means when the parts are secured together for carrying fluid therebetween and as a sealing means for each of the coupling parts when they are disconnected.

A further object of this invention is to provide a device which will alternately couple and seal the ends of tubes, pipes, hose and the like, such as may be employed in the handling of fluids, for example, oil, air, gasoline, water or the like.

It is a still further object of the present invention to provide a multipart coupling in which is provided a sealing means for effectively preventing the possibility of leakage between the coupling parts and the plug both when the parts are connected and disconnected.

Another and still further object of the present invention is to provide a coupling unit which may be readily and economically manufactured in considerable quantities.

Still further objects and features of the present invention will be apparent from the description thereof with reference to the appended drawing in which is illustrated a form of device embodying the inventive concept.

It should be noted, at the outset, that while the invention is hereinafter described as particularly adapted for use in conjunction with fuel and oil lines, such as are employed in connection with airplane engines, it should be understood that the couplings of the present invention are not limited to such use and that the invention relates to couplings in general.

In the drawing:

Figure 1 is a plan view of a form of quick disconnect coupling which embodies the principles of the present invention;

Figure 2 represents a vertical cross section through the device of Figure 1 as seen from the line II—II therein;

Figure 3 is a horizontal section taken substantially along the line III—III in Figure 2;

Figure 4 is a horizontal cross section corresponding generally to that of Figure 3 but with the parts of the coupling unit in disconnected relation;

Figure 5 is a vertical cross section, with parts broken away for the sake of clearness to illustrate underlying parts in elevation, as seen from the line V—V in Figure 3; and Figure 6 is an elevation, with parts broken away, showing one of the parts of the coupling unit illustrated in Figure 4.

As shown on the drawing:

The coupling unit illustrated in Figure 1 of the drawing comprises a pair of coupling parts or boxes 10 and 11 which are interconnected in fluid flow communication as by means of the generally cylindrical valve or plug 12. The plug 12 is advantageously made up of a plurality of cylindrical segments, in this case, semi-cylindrical portions 13 and 14. The parts 13 and 14 of the plug 12 co-operate in one position to connect the ports 15 and 16 in the coupling boxes 10 and 11, respectively, in fluid flow communication and, upon shifting the plug 12 to a position substantially 90° removed from that in which said ports are interconnected, to seal the coupling boxes 10 and 11 and render them detachable from one another.

The ports 15 and 16 are internally threaded or provided with other suitable means for securing thereto pipes, tubes, hose connections and the like such, for example, as the fuel pipes 17 and 18, respectively. The coupling boxes 10 and 11 co-operate when connected to form a generally cylindrical open-ended chamber 19 in which the plug 12 is rotatably mounted to control the flow of fluid between pipes 17 and 18. The portions 13 and 14 of the valve 12 which are disposed in mating relation as indicated at 20 are provided on their contiguous faces with locating means comprising a pair of pins 21, 21a which register with bores 22, 22a disposed in the plane faces of said plug portions to aid in reassembling the parts after they have been disconnected.

The coupling box 10 is provided with a pair of outwardly projecting ribs 23 and 24 of arcuate form which cooperate with similarly disposed and shaped ribs 25 and 26 on the coupling box 11 to form generally circular rims which trace the upper and lower extremities of the chamber 19 when said boxes are placed together. The portion 13 of the plug 12 has a semicircular upper flanged portion 27 and a similar lower flanged portion 28 at the outer periphery of which are formed inwardly projecting lip portions 29 and 30, respectively. The flanged portions 27 and 28 of the plug 13 together with lip portions 29 and 30, respectively, are adapted to engage the rim comprising the arcuate ribs 23 and 25 as well as that made up of corresponding ribs 24 and 26 of the coupling boxes 10 and 11 to hold the several parts in engaged relation when it is desired to maintain fluid flow communication therebetween.

The plug portion 14 is provided with similar upper and lower flanged portions 31 and 32 having inwardly projecting lip portions 33 and 34, respectively. Thus the plug 12 comprising portions 13 and 14 is supported in rotatable relation with respect to the upper rim comprising the outwardly projecting ribs 23 and 25 of coupling boxes 10 and 11, respectively, and a similar lower rim made up of ribs 24 and 26 of boxes 10 and 11. The plug 12 is rotated as by means of a suitable wrench or key applied to one or the other of the nubs 35 comprising, in each case, segments 36 and 37 associated with the plug portions 13 and 14, respectively.

The plug portion 13 is provided with a completely enclosed passageway 38 extending therethrough with its longitudinal axis substantially perpendicular to the vertical axis of said plug portion. The passage 38 in the plug portion 13 co-operates with a similar passageway 39 in the plug portion 14 to interconnect the ports 15 and 16 of the coupling boxes 10 and 11, respectively, when the plug 12 is disposed in a position corresponding to that illustrated in Figure 3 of the drawing.

In order to effectively seal the plug 12 with respect to each of the coupling boxes 10 and 11, a suitable sealing means 41 is associated with each box and adapted to be inserted in a recess 42 which is advantageously formed by counter-boring the ends of the ports 15 and 16, as the case may be, adjacent the chamber 19 which accommodates the plug 12. The sealing means 41, which may be formed of any suitable resilient material which will withstand the action of various types of fluid for which the coupling may be employed including such materials as cork, rubber, synthetic rubber, plastics or the like, is of substantially cylindrical form but has the end thereof in contact with the cylindrical surface of the plug 12 of concave or dished form. The sealing means 41 is additionally provided with a substantially diametrically disposed dividing wall 43 which is substantially coextensive in its length with that of the overall axial length of the sealing means 41 which serves to provide contact with the surface of the plug 12 adjacent the joint 20 between the portions 13 and 14 of the plug and serves effectively to prevent leakage therebetween.

In the operation of the coupling unit which illustrates the principles of the present invention, it will be understood that when the parts 13 and 14 of the plug 12 are disposed in the position illustrated in Figure 1 or 3 of the drawing, the passageways 38 and 39, respectively, will be in fluid flow communication with the ports 15 and 16 of the coupling boxes 10 and 11, respectively. In this position, the sealing means 41 prevents the possibility of leakage of the fluid at the chamber 19 formed by the coupling boxes 10 and 11 between the parts 13 and 14 of the plug 12 as well as between the external periphery of the plug 12 and the inner wall of the chamber 19. With the parts in this relationship, the upper and lower flanges 27 and 28 of the portion 13 of plug 12 together with corresponding flanges 31 and 32 of the portion 14 serve to retain the coupling boxes 10 and 11 in engagement by co-operation with the rim formed by the arcuate ribs 23 and 25 together with that made up of the corresponding ribs 24 and 26 at the extremities of the chamber 19.

When the plug 12 is rotated through an angle of 90° from its position as indicated in Figure 1 so that the portions 13 and 14 thereof are disposed in the positions indicated in Figure 4, the joint 20 between said portions 13 and 14 will be in a position corresponding with the joint indicated by the reference character 45 formed between the coupling boxes 10 and 11 and thus permits disengagement of the coupling boxes. The portion 13 of the plug 12 is thereupon held in engagement with the coupling box 10 by co-operation of the upper and lower lip portions 29 and 30 of the flanges 27 and 28, respectively, with the outwardly projecting arcuate ribs 23 and 24 of said coupling box 10. Similarly, the portion 14 is retained in coupling box 11 by co-operation of its inwardly projecting lip portions 33 and 34 on flanges 31 and 32, respectively, with the outwardly projecting arcuate ribs 25 and 26 of said coupling box 11. The sealing means 41 is adapted to establish a seal between the outer periphery of each of the plug portions 13 and 14 and the associated coupling boxes 10 and 11, respectively.

The coupling unit embodying the principles of the present invention is particularly adapted for coupling together the fuel lines serving an airplane engine with the lines from the fuel tanks mounted in the plane. While the engine is mounted in the fuselage, the fuel lines are connected directly with the tanks, pump units or other associated parts comprising the fuel feed system. When it is desired to remove the engine for repairs or servicing, it is advantageous to quickly and easily uncouple the lines without fear of leakage or drainage therefrom while they are disassembled. Thus, the coupling of the present invention which provides not only quick and easy detachment but also a positive sealing action when the parts are disconnected is admirably suited for this purpose.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. A detachable coupling for handling the flow of fluid therethrough comprising a pair of coupling boxes each of which has a port therein, a valve co-operating with said coupling boxes to alternately connect and seal said ports, said valve embodying a plurality of substantially identical generally cylindrical segments each having a passageway extending therethrough arranged to divide the fluid flow between the ports when connected thereto into a plurality of substantially equal parts, and resilient sealing means mounted between said valve and each of said coupling boxes having a plurality of passageways corresponding with the passageways in said valve.

2. A detachable coupling for handling the flow of fluid therethrough comprising a pair of coupling boxes each of which has a port therein, a valve co-operating with said coupling boxes to alternately connect and seal said ports, said valve embodying a plurality of substantially identical generally cylindrical segments each having a passageway extending therethrough arranged to divide the fluid flow between the ports when connected thereto into a plurality of substantially equal parts, and resilient sealing means in each of said coupling boxes, said sealing means having passageways corresponding with those of said valve and having the faces thereof in contact with said valve of substantially concave configuration.

3. A detachable coupling for handling the flow of fluid therethrough comprising a pair of coupling boxes each of which has a port therein, a valve co-operating with said coupling boxes to alternately connect and seal said ports, said valve embodying a plurality of substantially identical generally cylindrical segments each having a passageway extending therethrough arranged to divide the fluid flow between the ports when connected thereto into a plurality of substantially equal parts, a recess in each of said coupling boxes in concentric relation to the port therein, and a resilient sealing means in each recess, said sealing means having passageways corresponding with those of said valve and having the faces thereof in contact with said valve of substantially concave configuration.

4. A coupling comprising a pair of complementary parts having ports therein for fluid flow therethrough, a multi-segment valve rotatably mounted in both of said parts to detachably connect the same, each segment of said valve having a port closing wall and an independent passageway extending therethrough co-operating to join the ports in said parts when the valve is rotated to connect said parts, and means retaining a segment of said valve in each part with said wall in port-closing position when said valve is rotated to disconnect said parts.

5. A device for alternately connecting and sealing the spaced ends of a pair of conduits comprising an intermediate member characterized by a pair of complementary segments each of which has an independent passageway extending therethrough, said passageways interconnecting said conduits, and resilient sealing means for preventing leakage between said conduits and said passageways as well as between said segments.

6. A valve for a detachable coupling comprising a plurality of complementary substantially cylindrical segments, each of said segments having an enclosed passageway extending therethrough and being characterized by a periphery formed of a surface of revolution and a plane surface and locating means on the plane surface of each segment for assembling the parts together.

7. A resilient sealing means for a detachable coupling and the like, said sealing means being of generally cylindrical form having one end face thereof of concave configuration and a substantially axially extending aperture therein in which is provided a diametrically disposed division wall of a length substantially coextensive with that of the aperture.

8. A resilient sealing means for a detachable coupling and the like, said sealing means being of sleeve-like form having a sealing end face and a substantially axially extending aperture therein in which is provided a wall which divides said aperture into a plurality of passages of substantially equivalent shape and dimension.

9. A valve for a detachable coupling and the like for the control of fluid therethrough, said valve comprising a plurality of substantially identical mating segments each having a passageway extending therethrough to divide the fluid flow into a plurality of substantially equal parts.

10. A quick disconnect coupling which comprises a pair of ported complementary coupling boxes cooperating to define a valve-operating chamber, a split valve rotatably mounted in said operating chamber, each piece of said valve having a port-closing wall and a separate passageway therethrough for joining the ports in full fluid flow communication, cooperating means on said coupling boxes and on said valve arranged for connecting the coupling boxes in coupled relation when the valve passageways are in registration with said ports and for maintaining a piece of the valve in each coupling box when the valve is rotated to align its port-closing wall with the ports and to disconnect the coupling boxes, and a seal cooperating with said ports in each coupling box having an annular sealing face to stop leakage around the valve together with a bridging face to stop leakage between the valve pieces when the valve passageways are in registration with the ports.

ARTHUR TOWNHILL.